United States Patent

Espax

(10) Patent No.: US 8,045,597 B2
(45) Date of Patent: Oct. 25, 2011

(54) MULTI-PATH SEARCHING

(75) Inventor: Francesc Bolxadera Espax, Cambridge (GB)

(73) Assignees: MStar Semiconductor, Inc. (KY); MStar Software R&D (Shenzhen) Ltd., Shenzhen (CN); MStar France SAS, Issy les Moulineaux (FR); MStar Semiconductor, Inc. (TW)

( * ) Notice: Subject to any disclaimer, the term of this patent is extended or adjusted under 35 U.S.C. 154(b) by 388 days.

(21) Appl. No.: 10/548,448

(22) PCT Filed: Mar. 8, 2004

(86) PCT No.: PCT/GB2004/000995
§ 371 (c)(1),
(2), (4) Date: Sep. 9, 2005

(87) PCT Pub. No.: WO2004/082149
PCT Pub. Date: Sep. 23, 2004

(65) Prior Publication Data
US 2006/0188005 A1    Aug. 24, 2006

(30) Foreign Application Priority Data

Mar. 11, 2003   (GB) .................................. 0305561.3

(51) Int. Cl.
*H04B 1/00*   (2006.01)
(52) U.S. Cl. ........................................................ 375/142
(58) Field of Classification Search ................. 375/142, 375/147
See application file for complete search history.

(56) References Cited

U.S. PATENT DOCUMENTS

| | | | | |
|---|---|---|---|---|
| 5,764,687 A | * | 6/1998 | Easton | 375/147 |
| 6,144,649 A | | 11/2000 | Storm et al. | |
| 6,449,245 B1 | * | 9/2002 | Ikeda et al. | 370/208 |
| 7,224,719 B1 | * | 5/2007 | Hughes et al. | 375/147 |
| 2002/0118665 A1 | * | 8/2002 | Cleveland et al. | 370/342 |

FOREIGN PATENT DOCUMENTS

| | | |
|---|---|---|
| EP | 0 599 391 A2 | 6/1994 |
| GB | 2 364 487 | 1/2002 |
| GB | 2 371 725 | 7/2002 |
| WO | WO 01/76087 A1 | 10/2001 |

* cited by examiner

*Primary Examiner* — Chieh M Fan
*Assistant Examiner* — Jaison Joseph
(74) *Attorney, Agent, or Firm* — Edell, Shapiro & Finnan, LLC

(57) ABSTRACT

A method of multi-path searching in a cellular network is provided. The method carries out a correlation process over a predetermined integration period in relation to a first pilot signal received in connection with a first cell of the cellular network to generate first multiple correlation measurements corresponding to a plurality of time delays in the signal, analyzing the first multiple correlation measurements in relation to the time delays to identify multi-path positions in the signal. Information of the multi-path positions over a first predetermined integration period is stored as a first set of candidate multi-path positions and compared with a second set of candidate multi-path positions derived from second multiple correlation measurements corresponding to the time delays over a second predetermined integration period in relation to the first pilot signal, so as to confirm or reject candidate multi-path positions and define modified candidate multi-path positions.

3 Claims, 2 Drawing Sheets

US 8,045,597 B2

MULTI-PATH SEARCHING

CROSS REFERENCE TO RELATED APPLICATIONS

This application is a national phase application based on PCT/GB2004/000995, filed Mar. 8, 2004, and claims the priority of Great Britain Application No. 0305561.3, filed Mar. 11, 2003, the content of both of which is incorporated herein by reference.

FIELD OF THE INVENTION

This invention relates to multi-path searching in cellular communication systems, especially for mobile handsets in cellular networks.

BACKGROUND OF THE INVENTION

A mobile handset has to be designed to accommodate multi-path signals that may be present in the received signal, and for this purpose it incorporates a multi-path searcher which identifies the strongest of the multi-path signals to use. In a W-CDMA system, the Common Pilot Channel (CPICH) contains a predetermined sequence of pilot bits spread with known channelisation codes and scrambled with known scrambling codes, and the multi-path searcher makes measurements on the CPICH signal by correlating this against the known CPICH scrambled chip sequence to identify the path positions and select a sub-set to use for decoding. The multi-path searcher consists of multiple correlators which each process the same scrambling sequence and channelisation code to carry out a correlation measurement on the received signal after it has been delayed by a different time delay at the input of each correlator, the multiple correlation measurements so generated being analysed in relation to the time delays to identify the multi-path positions. In order to improve the accuracy and reliability in detecting path positions, the correlation process is extended over an integration time sufficient to identify the path positions above the noise floor of the signal. However, an increase in integration time results in an increase in processor/ASIC size and power consumption, which in turn leads to an increase in the manufacturing cost of the handset In addition, there is a requirement in the W-CDMA standard that a handset should be able to handle multi-path signals, as described above, in connection with multi-path CPICH signals corresponding to different cells of the cellular network, and that multi-path measurements should be made in relation to a predetermined number of cells should within a predetermined time, each cell being identified by its own scrambling code and channelisation code. Thus, if a multi-path searcher is used to make successive multi-path measurements in relation to multiple cells, the integration time for each is limited. Alternatively, if multiple multi-path searchers are provided to handle the multiple cells in parallel, then the manufacturing cost and power consumption is increased.

An object of the invention is to provide multi-path searching in such a manner as to mitigate the above problems.

SUMMARY OF THE INVENTION

According to the invention, a multi-path searcher is provided which carries out a correlation process over a predetermined integration period in relation to a first pilot signal received in connection with the first cell of a cellular network to identify the position of multi-paths in the signal, characterised in that information of said multi-path positions over a first predetermined integration period is stored as first candidate multi-path positions and compared with second candidate multi-path positions derived from multiple correlation measurements made subsequently by the multi-path searcher over a second predetermined integration period in relation to the first pilot signal, so as to confirm or reject candidate multi-path positions and define modified candidate multi-path positions.

Any uncertainty in candidate multi-path positions as measured in the first predetermined integration period is resolved by the candidate multi-path positions as measured in the second and subsequent predetermined integration periods, thus shorter integration periods can be used to reduce hardware size and cost, while an insufficiently low level of uncertainty in the measurement of candidate multi-path positions can still be accomodated.

By spacing said successive predetermined integration periods apart, multiple sets of integration periods can be interleaved and the same multi-path searcher can be used to determine the multi-path positions in relation to the pilot signal received in connection with each of different cells. Thus, the multi-path searcher carries out a first correlation process in relation to the pilot signal of each of different cells in succession to determine first candidate multi-paths for each, and then carries out a second correlation process in relation to each of the pilot signals again to determine second candidate multi-paths for each to confirm or reject the respective first candidate multi-paths and define modified candidate multi-path positions.

Thus the multi-path searcher is able to meet the standard required in measuring the multi-path positions of a predetermined number of cells within a limited time whilst still controlling the size of the hardware used.

The invention will now be described by way of example with reference to the accompanying drawings:

DETAILED DESCRIPTION OF THE PREFERRED EMBODIMENT

Figure 1:
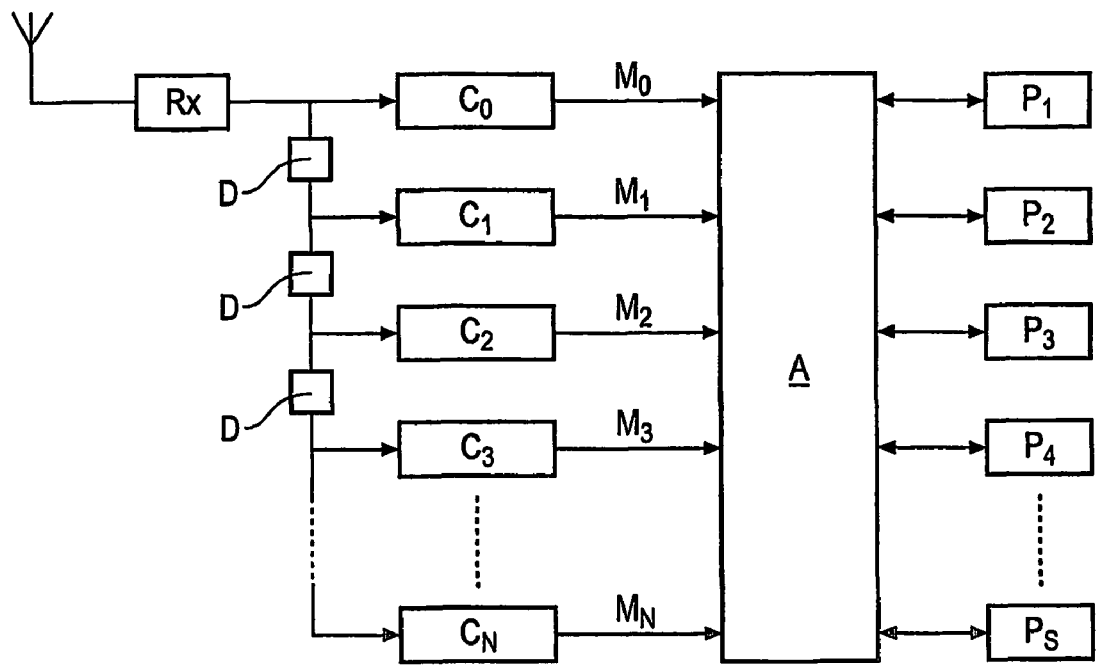
FIG. 1 is a schematic drawing of a multi-path searcher as used according to the invention.
Figure 2:
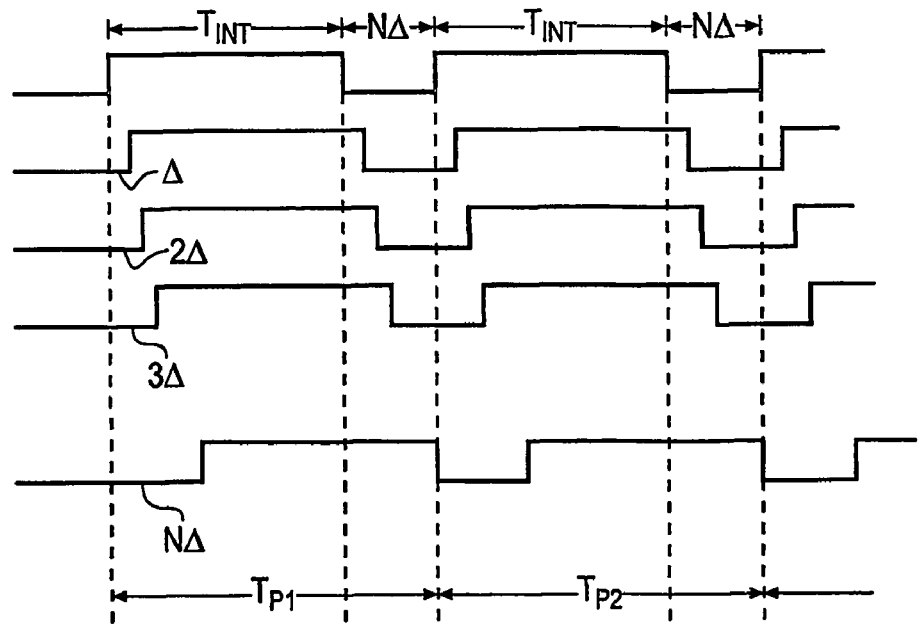
FIG. 2 is a schematic drawing showing the time delayed outputs of multiple correlators in FIG. 1.

The multi-path searcher in FIG. 1 comprises multiple correlators $C_0, C_1, C_2, C_3 \ldots C_N$ which are all fed the same input signal generated by a cellular receiver RX. The input signal is fed to the correlators via a chain of delay elements D which each introduce a delay $\Delta$ so that the input signal is delayed to each of successive correlators $C_0, C_1, C_2, C_3 \ldots C_N$ by a progressively increasing interval $\Delta, 2\Delta, 3\Delta \ldots N\Delta$ as shown in FIG. 2. In the first of multiple integration periods $T_{P1}$, each of the correlators processes the input signal using a scrambling sequence for the common pilot channel CPICH of a first cell CELL 1 so as to make multiple correlation measurements $M_0, M_1, M_2, M_3 \ldots M_N$, which are analysed in a processor A as a time plot, shown in FIG. 3, to determine multi-path positions in accordance with a reference L.

These multi-path positions are stored in a corresponding first store $P_1$.

Figure 3:
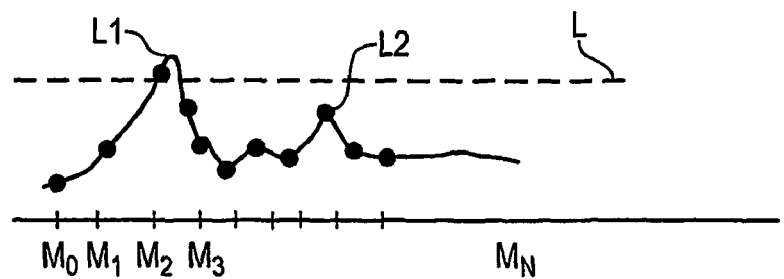
FIG. 3 is a plot of the outputs of the correlators of FIG. 1 in response to a typical CPICH signal, showing candidate multi-paths.

It will be appreciated that the correlation process in each correlator involves a de-scrambling, de-spreading and accumulation, of the bit streams representing the input signal to produce one of the probability measurements $M_0$, $M_1$, $M_2$, $M_3$ ... $M_N$. The reference level L is set at a predetermined level corresponding to the expected threshold for the existence of a multi-path. As shown in the example of FIG. 3, two significant peaks are detected, L1 above the level L and L2 just below the level L. Data of both of these peaks L1 and L2 are stored in the store $P_1$ as candidate multi-path positions.

As the correlation process continues, the correlators $C_0$, $C_1$, $C_2$, $C_3$ ... $C_N$ next make multiple correlation measurements over a second integration period $T_{P2}$ in relation to the CPICH channel of a second cell CELL 2 to determine corresponding candidate multi-path positions which are stored in the store P2. The same correlation process then runs for each of successive integration periods $T_{P3}$, $T_{P4}$ ... $T_{PS}$ in relation to the CPICH channel of 3rd, 4th ... 5th cells CELL 3, CELL 4 ... CELL S to determine corresponding candidate multi-path positions and to store these in respective stores $P_3$, $P_4$ ... $P_S$.

At this point, the multi-path detector has analysed the candidate multi-paths in S cells over a time period $ST_P$, assuming that the integration periods $T_{P1}$, $T_{P2}$, $T_{P3}$, $T_{P4}$ ... $T_{PS}$ are all equal to $T_P$. It will be appreciated that $T_P = T_{INT} + N\Delta$, where $T_{INT}$ is the period over which each correlator operates to generate a correlation measurement. Therefore, the period $T_{INT}$, delay $\Delta$ and number of correlators N are all selected in relation to the number of cells S to ensure that the multi-paths are determined for the required number of cells S in a predetermined time $ST_P$.

Figure 4:
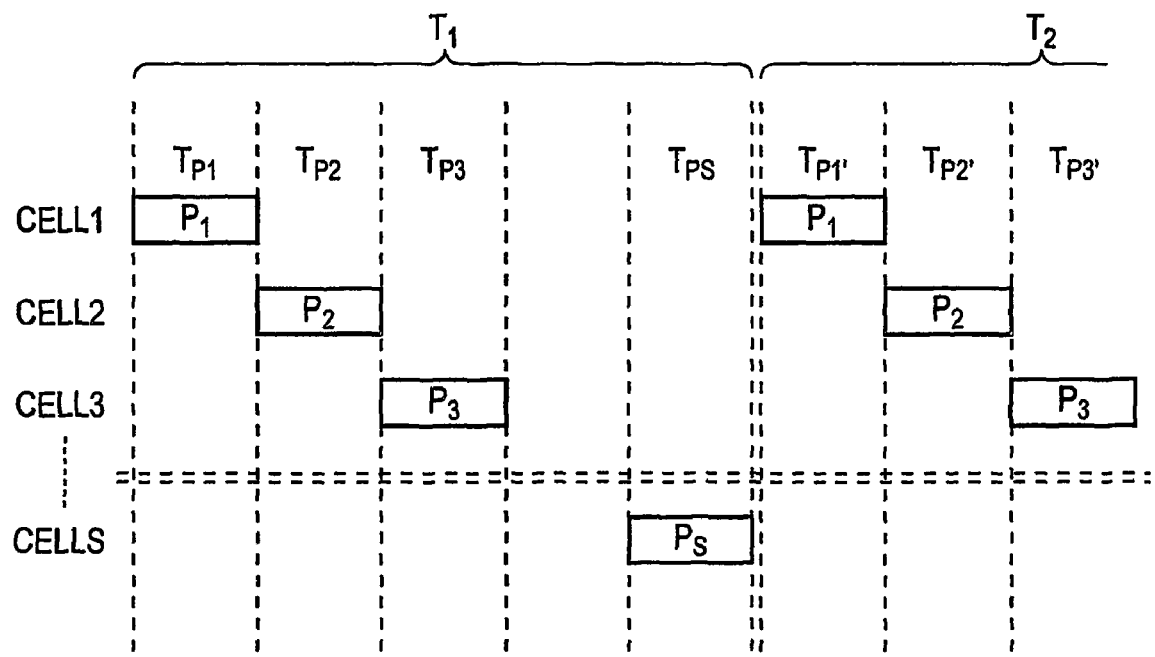
FIG. 4 is a diagram showing the timing of successive candidate multi-path measurements for different cells.

Having measured candidate multi-paths for each of the cells S in a first measurement cycle T1, as shown in FIG. 4, the correlators $C_0$, $C_1$, $C_2$, $C_3$ ... $C_N$ then repeat the whole process in a second measurement cycle T2 to determine a second set of candidate multi-path positions for each cell which are also stored in the respective stores $P_1$ to $P_S$ holding the first candidate multi-path positions. The first and second set of candidate multi-path positions stored in each store $P_1$ to $P_S$ are compared with one another by the processor A to produce a modified set of candidate multi-path positions, some candidate positions being confirmed and others being rejected. This process of modification of candidate multi-path positions to produce a modified set of multi-path positions with a higher probability of correctness, continues in successive measurement cycles. In this way, any lower level of probability accepted for determining individual candidate multi-path positions, perhaps because of a shorter than optimum period $T_{INT}$, is compensated for by subsequent repeat measurements.

To sum up, the present invention discloses a multi-path searcher comprising multiple correlators ($C_0$, $C_1$, $C_2$, $C_3$ ... $C_N$) which each process a predetermined scrambling sequence and channelisation code to carry out a correlation measurement on a received pilot signal after it has been delayed by a different time delay (D) at the input of each correlator. Multiple correlation measurements ($M_0$, $M_1$, $M_2$ ... $M_N$) are generated and analysed (A) in relation to the time delays to identify the multi-path positions. First candidate multi-path positions are identified over a first predetermined integration period ($T_{P1}$) and are stored and compared with second candidate multi-path positions derived from multiple correlation measurements made subsequently by the multi-path searcher over a second predetermined integration period ($T_{P2}$) in relation to a first pilot signal. The first and second candidate multi-path positions are confirmed or rejected to define modified multi-path positions. The successive predetermined integration periods ($T_{P1}$, $T_{P2}$) are spaced apart to accommodate one or more similar sets of successive integration periods in an interleaved manner, and the same multi-path searcher is used to determine multi-path positions in relation to the pilot signal received in connection with each of different cells (CELL 1, CELL 2, ... CELL S). Thus, the multi-path searcher carries out a first correlation cycle (T1) in relation to the pilot signal of each of different cells in succession to determine first candidate multi-paths for each, and then carries out a second correlation cycle (T2) in relation to each of the pilot signals again to determine second candidate multi-paths for each to modify the respective first candidate multi-paths.

The invention claimed is:

1. A method of multi-path searching in a cellular network in which a multi-path searcher is provided which carries out a correlation process over a predetermined integration period in relation to individual ones of a plurality of pilot signals received in connection with respective cells of the cellular network to generate first multiple correlation measurements corresponding to a plurality of time delays in the signal, analysing said first multiple correlation measurements in relation to said plurality of time delays to identify multi-path positions in the signal, characterised in that information of said multi-path positions over a first predetermined integration period is stored as a first set of candidate multi-path positions and compared with a second set of candidate multi-path positions derived from second multiple correlation measurements corresponding to said plurality of time delays made by the multi-path searcher over a second predetermined integration period in relation to an individual one of the pilot signals, so as to confirm or reject candidate multi-path positions and define modified candidate multi-path positions,
wherein the first predetermined integration period and the second predetermined integration period are substantially equal to one another,
wherein said second set of candidate multi-path positions is derived from a repeat correlation process performed to derive said first set of candidate multi-path positions, and
wherein first and second multiple correlation measurements are obtained for respective pilot signals in the plurality of pilot signals received in connection with the respective cells, and the first multiple correlation measurements of a second cell are obtained before the second multiple correlation measurements are obtained for a first cell such that the multiple correlation measurements for the first and second cells are interleaved with one another.

2. A multi-path searcher for multi-path searching in a cellular network by carrying out a correlation process over a predetermined integration period in relation to individual ones of a plurality of pilot signals received in connection with respective cells of the cellular network to identify the position of multi-paths in the signal, characterised in that storage is provided to store information of said multi-path positions over a first predetermined integration period as a first set of candidate multi-path positions and to store a second set of candidate multi-path positions derived from multiple correlation measurements made subsequently by the multi-path searcher over a second predetermined integration period in relation to an individual one of the pilot signals, and a comparator provided to compare said first and second candidate sets of multi-path positions so as to confirm or reject candidate multi-path positions and define modified candidate multi-path positions,
  wherein the first predetermined integration period and the second predetermined integration period are substantially equal to one another,
  wherein said second set of candidate multi-path positions is derived from a repeat correlation process performed to derive said first set of candidate multi-path positions, and
  wherein first and second multiple correlation measurements are obtained for respective pilot signals in the plurality of pilot signals received in connection with the respective cells, and the first multiple correlation measurements of a second cell are obtained before the second multiple correlation measurements are obtained for a first cell such that the multiple correlation measurements for the first and second cells are interleaved with one another.

3. A mobile handset incorporating a multi-path searcher as claimed in claim 2.

* * * * *